April 22, 1930.  W. R. STANFIELD  1,755,524
SUPPORTING AND DRIVING ATTACHMENT FOR TRACTOR OPERATED CORN HARVESTERS
Filed May 31, 1927
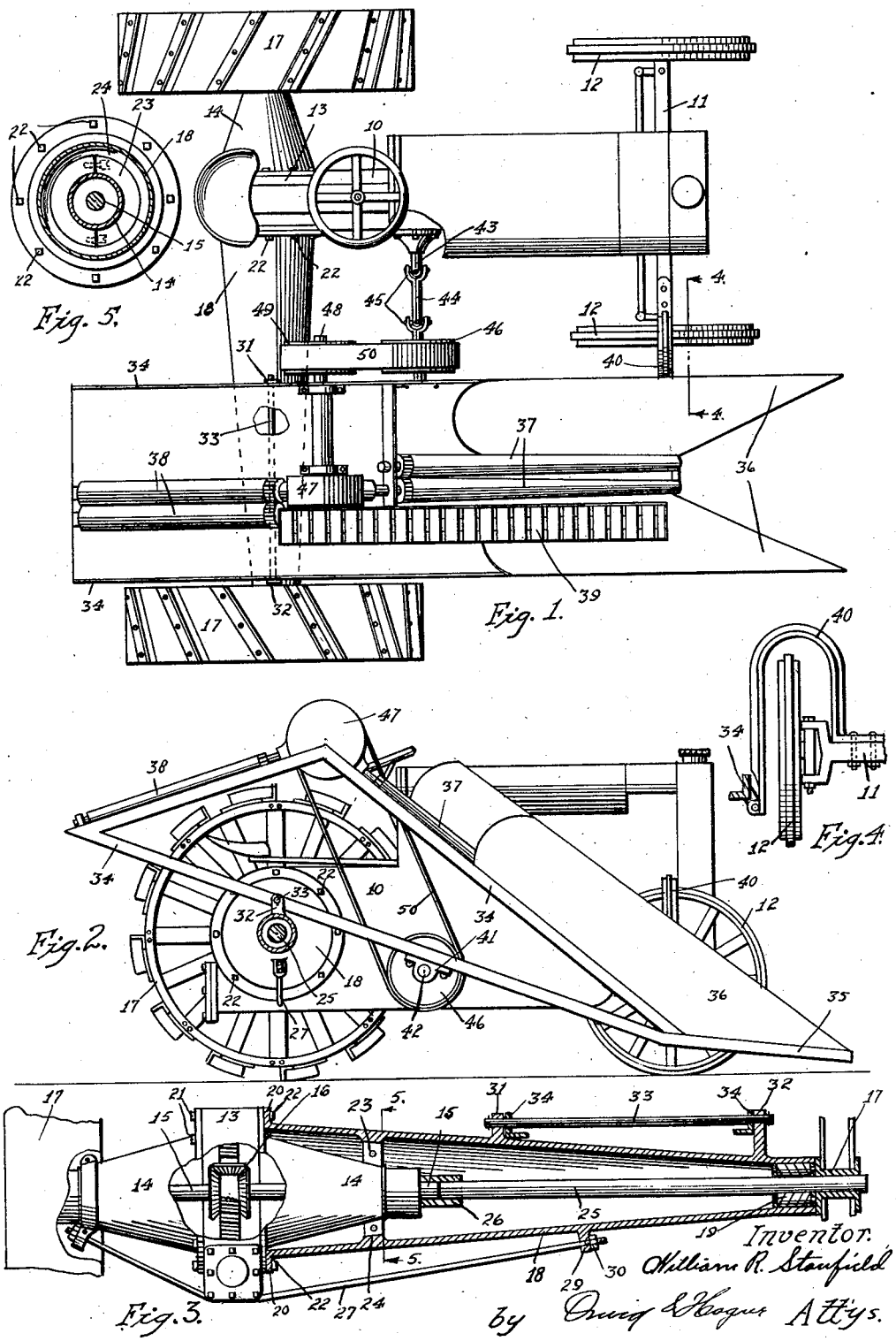

Patented Apr. 22, 1930

1,755,524

UNITED STATES PATENT OFFICE

WILLIAM R. STANFIELD, OF UNION, IOWA

SUPPORTING AND DRIVING ATTACHMENT FOR TRACTOR-OPERATED CORN HARVESTERS

Application filed May 31, 1927. Serial No. 195,425.

The object of my invention is to provide a simple, durable and inexpensive device whereby a harvester mechanism may be operated adjacent to one side of a tractor in such a manner that the harvester mechanism may be advanced over the ground surface by power derived from the traction wheels of the tractor, and whereby the power for operating the harvester mechanism may be derived directly from the power shaft of the tractor. The parts are so constructed and arranged that the tractor and harvester mechanism may be advanced over the ground surface in unison without causing side draft to the tractor, as ordinarily results when such a mechanism is advanced over the ground surface adjacent to one side of the tractor and operatively connected therewith.

More specifically it is the object of my invention to provide a device in the nature of an attachment which may be easily and quickly applied to the tractor frame, and when so applied is adapted to support and operate a harvester mechanism such as a corn picker My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of a tractor showing my improved device applied thereto.

Figure 2 is a side elevation of the same.

Figure 3 is a longitudinal sectional view of the auxiliary axle housing used in connecting my improved device.

Figure 4 is a detail sectional view taken on the line 4—4 of Figure 1.

Figure 5 is a detail sectional view taken on the line 5—5 of Figure 3.

The numeral 10 indicates the tractor frame supported by a front axle 11 and front wheels 12. The rear end of the tractor frame is provided with a differential housing 13 and axle housings 14. The housings 14 have axles 15 driven from the differential 16 within the housing 13, said differential being of the ordinary construction. Each of the axles 15 is provided with a tractor wheel 17 also of the ordinary construction.

In applying my improved device, I remove one of the tractor wheels 17, preferably the right hand wheel, and support the differential housing by a jack or suitable means. An auxiliary axle housing 18 is provided, which is hollow and of conical formation, having its smaller end provided with a bearing 19. The housing 18 is of such diameter as to be readily slipped over the housing 14 of the axle 15 from which the wheel 17 has been removed. The enlarged end of the housing 18 has outwardly extending lugs 20 designed to be supported against the flange of the housing 14, in the manner clearly illustrated in Figure 3. A number of bolts 21, for securing the housing 14 in position on the differential housing 13, are removed. The lugs 20 are supported against the flange of the housing 14 at points where the bolts have been removed, said lugs being provided with openings which aline with the openings of said housing, after which longer bolts 22 may be substituted for the bolts 21, thereby providing means for rigidly securing the housing 18 into position so that the bearing 19 will aline with the axle 15.

The housing 14 is also provided with an annular member 23 formed of two sections bolted together, and designed to engage an inwardly extending rib 24 of the housing 18, which provides means for rigidly supporting the outer end of the axle housing 14 relative to the housing 18. The length of the housing 18 is such that the distance between the center of the housing 13 and the outer end of the housing 18 is substantially equal to one and one-half times the distance between two adjacent rows of corn.

The bearing 19 is provided with an auxiliary axle 25 coupled to the outer end of the axle 15 by means of a coupling 26, so that the axles 15 and 25 will be operated in unison. The wheel 18 that has been removed is mounted on the outer end of the axle 25. A truss rod 27 is provided which is supported adjacent to the under side of the housing 13, having one end connected to a collar 28 supported on the housing 14 opposite the one on which the housing 18 is mounted. The other end of the truss rod 27 is anchored in a downwardly extending lug 29 from the lower side of the housing 18. Suitable nuts 30 are provided for applying the proper tension to the rod 27 in the usual manner. The upper side of the housing 18 is provided with upwardly extending lugs 31 and 32 designed to receive a shaft or rod 33. Frame members 34 are pivotally mounted on the shaft 33. The said frame members 34 are formed substantially triangular and supported in upright planes, and spaced apart in the manner clearly illustrated in Figures 1 and 3.

The said frame members 34 are provided with forwardly extending portions 35 for supporting gathering boards 36 of the corn harvester. The frame members 34 are also designed to support the snapping rollers 37, the husking rollers 38 and the conveyor 39, which are of the ordinary construction. The frame members 34 are designed to be supported in a plane parallel with the tractor frame, with the inner frame member outside of the front wheel 11, as illustrated in Figure 5. The forward ends of the frame members 34 are supported by means of an inverted U-shaped bar 40, having one end connected to the axle 11 and its other end connected to the inner one of the frame members 34, in the manner clearly illustrated in Figure 4.

The frame members 34 are provided with bearings 41 for receiving a shaft 42 in alinement with the power shaft 43 of a tractor. The shafts 42 and 43 are connected by a short shaft 44 and universal joints 45. The inner end of the shaft 42 is provided with a belt wheel 46, while the upper end of the frame members 35 are provided with a gear housing 47 having gears for operating the snapping rollers 37 and 38. The housing 47 has a shaft 48 carrying a pulley 49 on its inner end, said pulley being in alinement with the pulley 46. Said pulleys 46 and 49 are operatively connected with a belt 50. Means is thereby provided whereby a harvesting mechanism may be operated directly from the power shaft 43 through the shafts 44, 45 and 48, the pulleys 46 and 49 and the belt 50, while the mechanism is carried principally by the auxiliary axle housing 18, said housing being of such length that the tractor may straddle one row that has already been operated upon while the harvesting mechanism is operating on an adjacent row.

I am well aware that harvesting mechanisms have been placed to one side of a tractor and operated by power derived from the tractor, and advanced over the ground surface by power derived from the tractor wheels. Great difficulty has been experienced heretofore in coupling up such a device with a tractor, on account of the side draft that is thereby created, as the weight of the harvesting mechanism amounts to considerable. This has a tendency to cause the front wheels of the tractor to slide laterally, causing a large amount of difficulty in steering the mechanism in such a manner as to cause the harvesting device to follow the row being operated upon. This is especially true when the mechanism is operated on side hills. By providing the auxiliary housing 18 and supporting the harvesting mechanism thereon, I have provided means whereby each of the tractor wheels will operate substantially midway between two adjacent rows of corn. By driving both of said wheels from a common differential, I have provided means whereby the side draft of the tractor will be practically eliminated. It will readily be seen that the torque applied to each of the traction wheels will be equal, and for that reason the general line of advance of the tractor will be in a straight path. The weight on each of the tractor wheels is substantially equally divided, and the weight of the tractor being carried by one of the wheels and the weight of the harvesting mechanism carried by the other. The frame members 34 are mounted on the auxiliary housing 18 in such a manner as to be substantially balanced. The husking rollers 38 are mounted back of the vertical line extending through the axle, while the snapping rollers are mounted ahead of the said vertical line. In addition to the snapping rollers 38, elevating conveyors and the like are also mounted, which are not illustrated in the drawings but are of the ordinary construction.

The frame members 34 are of such length as to terminate near the forward side of the wheels 12, so that the front axle 11 provides means for gauging the depth of the front ends of the frame members, so that the forward end of the gathering mechanism will automatically follow the contour of the ground surface.

It will further be seen that very simple means is provided for imparting movement to the harvester mechanism, power being derived from the power shaft already installed on the tractor, and which may be operated independently of the advance of the tractor.

I claim as my invention:

1. In combination, a tractor having an axle housing, an axle for said housing, an auxiliary housing surrounding the axle housing of a length considerably longer than the length of the axle housing, an auxiliary axle carried in said auxiliary housing, means for coupling said auxiliary axle with the tractor axle, and a harvester frame supported adjacent to one side of said tractor and carried by said auxiliary housing.

2. In combination, a tractor having an axle housing, an axle for said housing, a power shaft, an auxiliary housing surrounding said axle housing and of a length considerably longer than said axle housing, an auxiliary axle for said auxiliary axle housing, means for coupling said auxiliary axle to said axle, a harvester frame supported adjacent to one side of said tractor and carried by said auxiliary housing, mechanism carried by said harvester frame for operating harvester mechanism, and means for operatively connecting the last said mechanism with said power shaft.

3. In combination, a tractor having a differential housing and axle housings, differential gears within said differential housing, axles operatively connected with said differential, a traction wheel for one of said axles, an auxiliary axle housing, an auxiliary axle carried by said auxiliary axle housing, means for coupling said auxiliary axle to one of said axles, a tractor wheel for said auxiliary axle, and a harvester frame supported between the last said tractor wheel and the said tractor and carried by said auxiliary housing.

4. In combination, a tractor having a power shaft, axle housings, and differential gears, axles operatively connected with said differential, a traction wheel for one of said axles, an auxiliary axle housing, an auxiliary axle carried by said auxiliary axle housing, means for coupling said auxiliary axle to one of said axles, a tractor wheel for said auxiliary axle, a harvester frame supported between the last said tractor wheel and the said tractor and carried by said auxiliary housing, and means carried by said harvester frame for operating a harvesting mechanism, the last said means being operatively connected with said power shaft.

5. In combination, a tractor having a front axle and rear axles, traction wheels for said rear axles, a harvester frame supported on one of the rear axles between the traction wheel of said axle and the tractor frame, said harvester frame extending forwardly and adjacent to one end of said front axle, and means carried by said front axle for supporting the forward end of said harvester frame.

6. In a device of the class described, a hollow conical shaped axle housing, an auxiliary shaft supported in said housing, means for coupling the inner end of said auxiliary shaft with one end of a tractor axle, means for securing said housing to the axle housing of a tractor, a harvester frame supported transversely above said axle housing, means for pivotally connecting said auxiliary frame with said housing, and means for supporting one end of said harvester frame from the front axle of a tractor.

7. In combination, a differential housing, axle housings projecting laterally from said differential housing, bolts for securing said axle housings to said differential housings, an auxiliary axle housing supported adjacent to one of said axle housings, means for connecting one end of said auxiliary housing to said differential housing, means for connecting the outer end of said axle housing to said auxiliary housing, an axle for said axle housing, an auxiliary axle for said auxiliary housing, means for connecting said axle and said auxiliary axle together and in alinement, and a harvester frame pivotally connected to said auxiliary housing.

8. In combination, a tractor having a front axle and rear axles, tractor wheels for said rear axles, a harvester frame supported on one of the rear axles between the tractor wheel of said axle and the tractor frame, said harvester frame extending forwardly and adjacent to one end of said front axle, an inverted U-shaped frame member having one of its legs supported on one end of the front axle of said tractor and its opposite end connected with the forward end of said harvester frame for supporting the same, with one of the wheels of said front axle within said U-shaped frame.

Des Moines, Iowa, May 12, 1927.

WILLIAM R. STANFIELD.